United States Patent [19]

Kelly et al.

[11] Patent Number: 5,399,298

[45] Date of Patent: Mar. 21, 1995

[54] OPTICAL FILTERS WITH COATINGS TRANSMISSIVE IN NARROW WAVEBAND REGIONS

[75] Inventors: Christopher J. Kelly, Troon; Michael A. Biagi, Paisley; Brian C. Monachan, Bearsden, all of Scotland

[73] Assignee: Barr & Stroud, Ltd., Glasgow, Scotland

[21] Appl. No.: 947,514

[22] Filed: Oct. 27, 1986

[30] Foreign Application Priority Data

Nov. 1, 1985 [GB] United Kingdom ............... 8527000

[51] Int. Cl.$^6$ .................................................. G02B 5/20
[52] U.S. Cl. ...................................... 252/584; 427/165; 428/432; 428/918; 428/920; 357/588
[58] Field of Search ............... 350/164, 166, 311, 313, 350/316, 317; 252/582, 584; 427/165; 428/432, 910, 913, 918; 359/588

[56] References Cited

U.S. PATENT DOCUMENTS

| | | | |
|---|---|---|---|
| 4,068,260 | 1/1978 | Ohneda et al. | 350/166 |
| 4,128,303 | 12/1978 | Onoki et al. | 350/164 |
| 4,284,323 | 8/1981 | Jankowitz | 350/164 |
| 4,309,075 | 1/1982 | Apfel et al. | 350/164 |
| 4,313,647 | 2/1982 | Takazawa | 350/164 |
| 4,373,782 | 2/1983 | Thelen | 350/164 |
| 4,377,324 | 3/1983 | Durand et al. | 350/352 |
| 4,659,178 | 4/1987 | Kyogoku | 350/316 |
| 4,666,250 | 5/1987 | Southwell | 350/166 |

*Primary Examiner*—Peter A. Nelson
*Attorney, Agent, or Firm*—Bell, Seltzer, Park & Gibson

[57] ABSTRACT

An optical filter comprises a multilayer coating adherent to a substrate, the coating comprising at least four superimposed layer collections. Each layer collection has ordered first, second and third layers of which the first and third layers are made of a first material and are 0.6 quarter wavelengths thick whereas the second layer is made of a second material and is 6.8 quarter wavelengths thick. One of these materials has a high refractive index in the range 1.9 to 2.5 whilst the other of these materials has a low refractive index in the range 1.3 to 1.7. The preferred high index material is zinc sulphide and the preferred low index material is thorium fluoride.

The optical filter is generally transmissive except in a number of narrow waveband regions which include respective known laser wavelengths.

8 Claims, 1 Drawing Sheet

OPTICAL FILTERS WITH COATINGS TRANSMISSIVE IN NARROW WAVEBAND REGIONS

This invention related to optical filters and in particular to a filter in the form of a multi-layer coating on a substrate.

Various optical devices are concerned with transmitting radiation over a relatively broad spectrum but in certain fields of use, particularly military use, the broad spectrum encompasses one or more discrete wavelengths or narrow wavebands at which high energy radiation exists and there is a need to prevent such high energy radiation being transmitted through the optical device. In one example the optical device may be a pair of goggles (or spectacles) to be worn by a human observer and on the one hand there is a need for the goggles to transmit radiation generally over the visible spectrum whilst on the other hand there is a need to protect the observers eyes from damaging laser radiation which may occur at one or more of at least three particularly-favoured laser radiation wavelengths.

According to the present invention there is provided an optical filter in the form of a multi-layer coating adherent to a substrate, said coating comprising a plurality of superimposed layer collections, said plurality being n in number where n is at least four, each layer collection comprising ordered first second and third layers, said first and third layers each being made of a first optical coating material and having a thickness of substantially 0.6 quarter wavelengths at a predetermined wavelength, said second layer being made of a second optical coating material and having a thickness of substantially 6.8 quarter wavelengths at said predetermined wavelength, one of said first and second optical coating materials having a high refractive index and the other of said optical coating materials having a low refractive index, whereby the coating is generally transmissive except in a number of narrow-waveband regions, said predetermined wavelength being selected so that at least one of said regions includes a known laser wavelength.

The number n may be in the range 4 to about 20 (being limited at the upper end of the range by manufacturing processes) and the greater the value of n the less is the transmission within said narrow-waveband regions.

The first layer of each said layer collection may be composed of said high refractive index material. Alternatively the first layer of each said layer collection may be composed of said low refractive index material. Typical high refractive index optical coating materials have refractive indices in the range 1.9 to 2.5 and are: zinc sulphide, titania, certain rare earth oxides and certain sulphides and selenides. Typical low refractive index optical coating materials have refractive indices in the range 1.3 to 1.7 and are: thorium fluoride, silica, certain rare earth fluorides and certain oxides.

The optical filter of the present invention may be one of a pair of spaced filters separated by a medium which preferably possesses absorption properties as a result of which the combination exhibits improved rejection efficiency within the narrow-waveband regions in comparison with a single coating with a given value of n. Also, in this arrangement it is preferred that each optical coating material possesses a small but finite degree of absorption since this attenuates multiple reflections between the coatings and improves the rejection efficiency within the narrow-waveband regions for a given value of n.

By virtue of the presence of said narrow-waveband regions the optical filter of the present invention provides rejection of incident laser radiation. The rejection efficiency for normal incidence of the laser radiation on the filter is substantially maintained for incidence angles within a limited angular range the magnitude of which is determined by the width of the narrow-waveband region of the coating, because at non-normal incidence the coating characteristics effectively shift spectrally downwards in proportion to the angle of incidence.

The coating of the optical filter of the present invention may be index-matched to its adjoining media either by variation of the thicknesses of the first and/or last layers of the coating or by additional layers of index-matching material. Such additional matching layers do not significantly affect the rejection characteristics of the narrow-waveband regions but provide a noticeable improvement in the overall transmission efficiency of the coating.

The filter of the present invention may incorporate a substrate in the form of a colour glass for rejecting a particular wavelength or narrow-waveband region to which the multi-layer coating is transmissive.

DETAILED DESCRIPTION OF THE INVENTION

Embodiments of the present invention will now be described by way of example with reference to the accompanying drawings which illustrate the transmission characteristics of different optical filters of the present invention.

Figure 1:
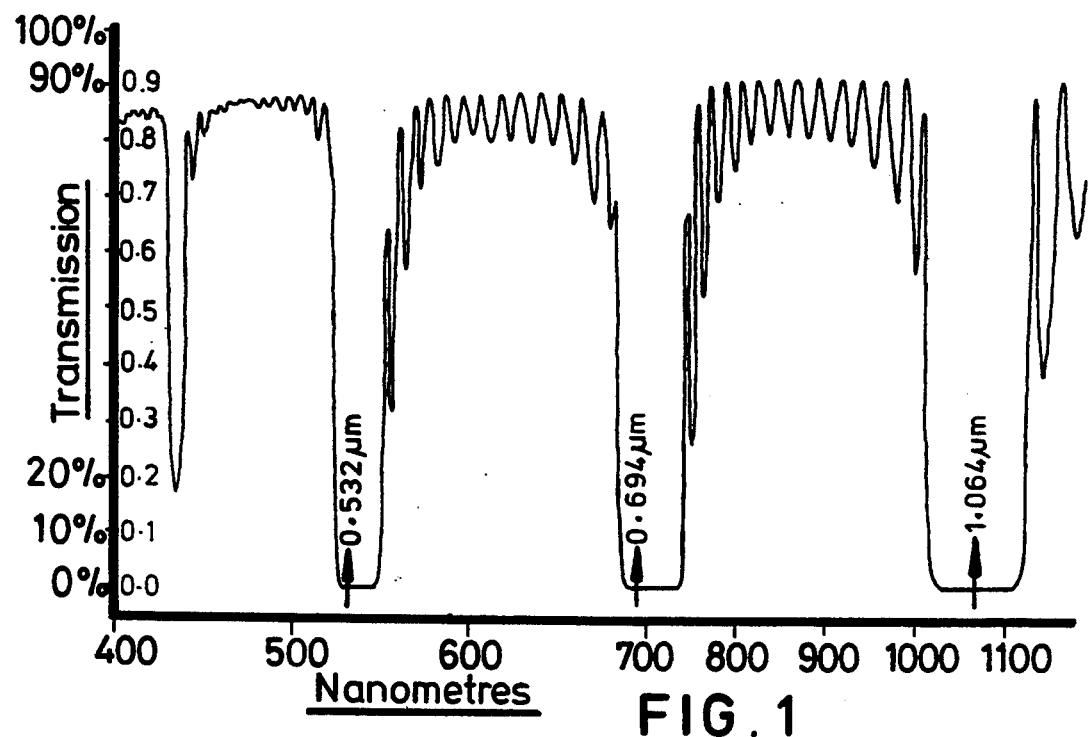
FIGS. 1 and 2 are transmission curves for composites constructed herein.

In a first embodiment the substrate is clear glass and the coating is composed of fourteen identical and superimposed layer collections each of which has first and third layers made of zinc sulphide and a second layer made of thorium fluoride. The zinc sulphide layers are each 0.6 quarter wavelengths thick at a wavelength of 0.543 $\mu$m and the thorium fluoride layer is 6.8 quarter wavelengths thick at the 0.543 $\mu$m wavelength. The transmission characteristic of this optical filter is shown in FIG. 1 and at the three particularly-favoured laser radiation wavelengths of 0.532 $\mu$m, 0.694 $\mu$m, and 1.064 $\mu$m the optical density of the filter provides effective blocking protection against transmission of laser radiation for a range of incidence angles of the order of $\pm 22°$ with an overall transmission efficiency of the order of 50% elsewhere in the visible spectrum as measured by the conventional integrated visible photopic transmission factor F, where $$F = \frac{\int_{400}^{700} T(\lambda) \cdot E(\lambda) \cdot E(D_{65}) \cdot d\lambda}{\int_{400}^{700} E(\lambda) \cdot E(D_{65}) \cdot d\lambda}$$

$T(\lambda)$ being filter transmission with respect to wavelength $\lambda$;

$E(\lambda)$ being the photopic eye response as a function of wavelength $\lambda$;

$E(D_{65})$ being the response of the standard $D_{65}$ illuminant as a function of wavelength $\lambda$.

More particular quantitative values for the filter of the first embodiment are set forth in Table I, the angular range values given being for simultaneous effective protection at the three laser radiation wavelengths.

In a second embodiment two coatings of the Table I type are cemented together with a non-absorbing optical cement, namely Norland Inc. cement designation No, NOA61 and the combined filter arrangement displays improved characteristics as set forth in Table II, the angular range values given being for simultaneous effective protection at the three laser radiation wavelengths.

By way of example and with reference to the second embodiment utilising combined filters where the coating materials are free of absorption characteristics the improvement in optical density within the narrow-waveband region is relatively marginal (e.g. if the optical density of a filter is 4.0 the optical density of a combined filter is 4.3). If an absorption medium is utilised between the two filters, such as Schott NG 12 neutrally absorbing glass which has an absorption of about 10%, the optical density of the combined filter is 7.3. Where the optical coating materials of each filter possess an absorption of about 0.5%, as in the Table II embodiment, the optical density of the combined filter is 6.0. In both cases the overall transmission factor remains of the order of 40–50%.

In a third embodiment the materials are the same as in the first embodiment and the layer collections are the same in number but the first and third layers are made of thorium fluoride whilst the second layer is made of zinc sulphide. The thorium fluoride layers of the third embodiment are each 0.6 quarter wavelength thick at a wavelength of 0.543 $\mu$m and the zinc sulphide layers are each 6.8 quarter wavelengths thick at the same 0.543 $\mu$m wavelength. Quantitative values of transmission parameters are set forth in Table III for the third embodiment, and in comparison with the Table I values for the first embodiment it will be observed that there is very little difference. However the first embodiment has its angular performance limited by the coating behaviour at 0.532 $\mu$m whereas the third embodiment has its angular performance limited by the coating behaviour at 1.064 $\mu$m and colour glasses are readily available which are effectively non-transmitting at 1.064 $\mu$m but which are substantially fully transmitting at the visible region of the spectrum.

Figure 2:
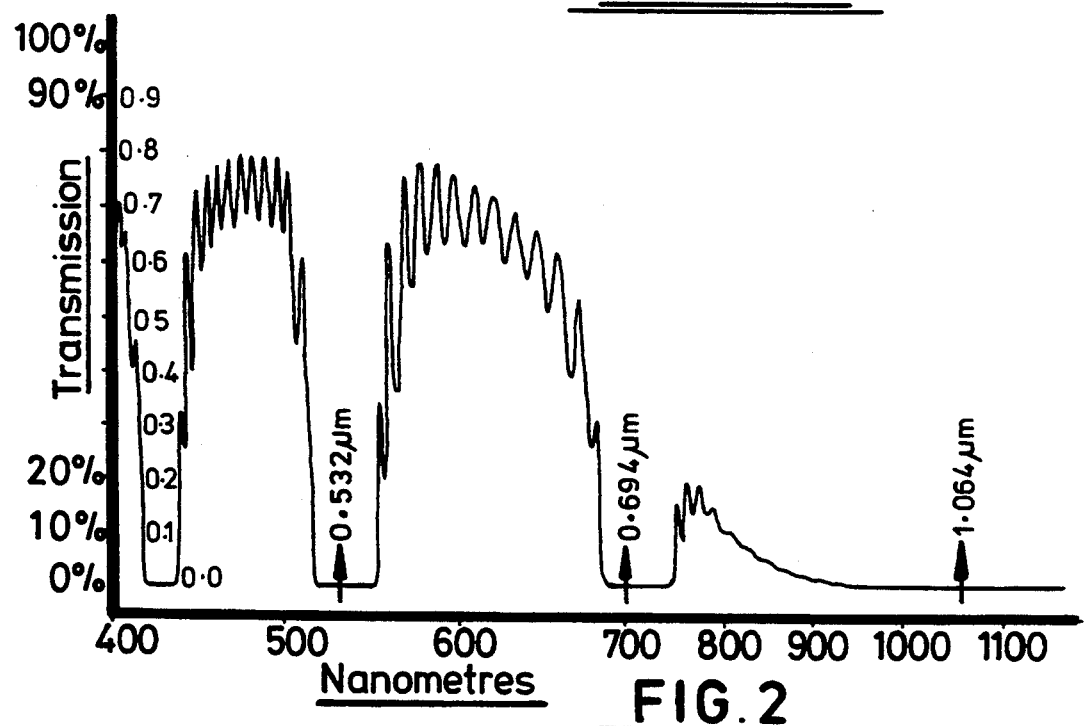

A fourth and preferred embodiment is therefore provided by the third embodiment modified by a colour glass, either as a substitute for or in addition to the clear glass substrate, of 2.5 mm thickness and made of LP3 colour glass (made and sold by Chance-Pilkington Ltd.). Quantitative values of transmission parameters are set forth in Table IV for the fourth embodiment and the transmission characteristic of this optical filter is shown in FIG. 2. It will be appreciated that the fourth embodiment provides substantially improved angular performance and provides effective blocking protection for a range of incidence angles of the order of ±38° and overall transmission efficiency (F) of the order of 42%.

In a fifth embodiment two filters of the Table III type are cemented together with the same cement as in the second embodiment, and the combined filter arrangement displays the characteristics set forth in Table V.

In a sixth embodiment one filter of the Table III type and one filter of the Table IV type are cemented together with the same cement as in the second embodiment, and the combined filter arrangement displays the characteristics set forth in Table VI.

| Substrate | Optical Density | | | ANGULAR RANGE | IVPT % |
|---|---|---|---|---|---|
| | 0.532 $\mu$m | 0.694 $\mu$m | 1.064 $\mu$m | | |
| TABLE I | | | | | |
| Clear glass | $\geq 4.0$ | $\geq 4.0$ | $\geq 3.5$ | +20 to ±24° | 45–55 |
| TABLE II | | | | | |
| Clear glass | $\geq 5.5$ | $\geq 5.0$ | $\geq 4.5$ | +23 to ±30° | 40–50 |
| TABLE III | | | | | |
| Clear glass | $\geq 4.0$ | $\geq 4.0$ | $\geq 3.5$ | +22 to ±26° | 42–52 |
| TABLE IV | | | | | |
| Colour glass | $\geq 4.0$ | $\geq 4.0$ | $\geq 6.0$ | +35 to ±40° | 37–47 |
| TABLE V | | | | | |
| Clear glass | $\geq 5.0$ | $\geq 5.0$ | $\geq 4.0$ | +25 to ±30° | 35–45 |
| TABLE VI | | | | | |
| Colour glass | $\geq 5.0$ | $\geq 5.0$ | $\geq 6.0$ | +37 to ±42° | 30–40 |

We claim:

1. An optical filter in the form of a multi-layer coating adherent to a substrate, said coating comprising a plurality of superimposed layer collections, said plurality being n in number where n is at least four, each layer collection comprising ordered first second and third layers, said first and third layers each being made of a first optical coating material and having a thickness of substantially 0.6 quarter wavelengths at a predetermined wavelength, said second layer being made of a second optical coating material and having a thickness of substantially 6.8 quarter wavelengths at said predetermined wavelength, one of said first and second optical coating materials having a high refractive index and the other of said optical coating materials having a low refractive index, whereby the coating is generally transmissive except in a number of narrow-waveband regions, said predetermined wavelength being selected so that at least one of said regions includes a known laser wavelength.

2. An optical filter as claimed in claim 1, wherein said high refractive index material has a refractive index in the range 1.9 to 2.5 and said low refractive index material has a refractive index in the range 1.3 to 1.7.

3. An optical filter as claimed in claim 1, wherein said high refractive index material is zinc sulphide and said low refractive index material is thorium fluoride.

4. An optical filter as claimed in claim 1, wherein the first layer of each said layer collection is composed of said high refractive index material.

5. An optical filter as claimed in claim 1, wherein the first layer of each said layer collection is composed of said low refractive index material.

6. An optical filter as claimed in claim 1, wherein said substrate is made of clear glass.

7. An optical filter as claimed in claim 1, wherein said substrate is made of colour glass for rejecting a narrow waveband region to which the multi-layer coating is transmissive.

8. An optical filter assembly comprising a pair of spaced optical filters each as claimed in claim 1 and separated by a medium having absorption properties.

* * * * *

UNITED STATES PATENT AND TRADEMARK OFFICE
CERTIFICATE OF CORRECTION

PATENT NO. : 5,399,298

DATED : March 21, 1995

INVENTOR(S) : Christopher J. Kelly, et al.

It is certified that error appears in the above-identified patent and that said Letters Patent is hereby corrected as shown below:

Column 1, line 6, "related" should be -- relates --.

Column 3, line 10, after "No" the comma (,) should be a -- period (.) --.

Column 4, in the Table, lines 4-24, 5th column, "+" should be -- ± --; and "22", "35", "25" and "37" should all have --°-- after each.

Signed and Sealed this

Fourth Day of July, 1995

Attest:

BRUCE LEHMAN

*Attesting Officer*    *Commissioner of Patents and Trademarks*

UNITED STATES PATENT AND TRADEMARK OFFICE
CERTIFICATE OF CORRECTION

PATENT NO. : 5,399,298
DATED : March 21, 1995
INVENTOR(S) : Christopher J. Kelly, et al.

It is certified that error appears in the above-identified patent and that said Letters Patent is hereby corrected as shown below:

Column 4, in the Table, lines 8-11, 5th column, "+" should be -- ± --;

Signed and Sealed this

Seventh Day of November, 1995

Attest:

BRUCE LEHMAN

*Attesting Officer*     *Commissioner of Patents and Trademarks*